United States Patent [19]

Aron et al.

[11] Patent Number: 5,953,894
[45] Date of Patent: Sep. 21, 1999

[54] HAYMAKING MACHINE

[75] Inventors: Jérôme Aron, Dossenheim-Sur-Zinsel; Michel Quirin, Allenwiller, both of France

[73] Assignee: Kuhn S.A., Saverne Cedex, France

[21] Appl. No.: 08/936,466

[22] Filed: Sep. 24, 1997

[30] Foreign Application Priority Data

Oct. 3, 1996 [FR] France ................................ 96 12218

[51] Int. Cl.⁶ .......................... A01D 78/10; A01D 80/00
[52] U.S. Cl. ............................. 56/367; 56/365; 56/370; 56/374; 56/377; 56/397; 172/311
[58] Field of Search .............................. 56/367, 370, 216, 56/228, 374, 397, 377, 365, 366; 172/311, 501

[56] References Cited

U.S. PATENT DOCUMENTS

| | | |
|---|---|---|
| 3,650,101 | 3/1972 | Aron . |
| 4,144,699 | 3/1979 | Aron . |
| 4,149,364 | 4/1979 | Aron . |
| 4,178,998 | 12/1979 | Rockwell . |
| 4,628,673 | 12/1986 | Aron . |
| 4,656,821 | 4/1987 | Aron . |
| 4,693,065 | 9/1987 | Aron et al. . |
| 4,723,404 | 2/1988 | Aron . |
| 4,875,332 | 10/1989 | Aron . |
| 4,914,901 | 4/1990 | Aron . |
| 4,922,700 | 5/1990 | Aron . |
| 4,953,346 | 9/1990 | Aron . |
| 4,996,833 | 3/1991 | Von Allowerden ........................ 56/367 |
| 5,024,053 | 6/1991 | Aron . |
| 5,060,465 | 10/1991 | Aron . |
| 5,111,636 | 5/1992 | Quirin . |
| 5,274,990 | 1/1994 | Aron et al. . |
| 5,586,421 | 12/1996 | Aron . |
| 5,784,873 | 7/1998 | Aron ...................................... 56/367 X |

FOREIGN PATENT DOCUMENTS

| | | |
|---|---|---|
| 0 296666 | 12/1988 | European Pat. Off. . |
| 0 300 937 | 1/1989 | European Pat. Off. . |
| 2 275 980 | 1/1976 | France . |
| 2 661 312 | 10/1991 | France . |
| 91 11 676 U | 11/1991 | Germany . |
| 295 13 712 U | 12/1995 | Germany . |

*Primary Examiner*—Robert E. Pezzuto
*Attorney, Agent, or Firm*—Oblon, Spivak, McClelland, Maier & Neustadt, P.C.

[57] ABSTRACT

A haymaking machine having a chassis which is composed of a central section and several lateral sections which are articulated together and carry rotors. On each side of the central section four lateral sections are provided which are articulated together by axes extending in the direction of travel, the length of each first lateral section being at least equal to the distance between the support spindles of two adjacent rotors, the length of each second lateral section being substantially longer than the distance between the support spindles of the two adjacent rotors, the length of each third lateral section being substantially shorter than the distance between the support spindles of the first adjacent rotors, and the length of each fourth lateral section being at most equal to the distance between the support spindles of the two adjacent rotors.

14 Claims, 4 Drawing Sheets

HAYMAKING MACHINE

BACKGROUND OF THE INVENTION

1. Field of the Invention

The present invention relates to a haymaking machine, especially a tedder, comprising a chassis that can be coupled to a tractor, which chassis is composed of a central section and several lateral sections which are articulated together and which carry rotors mounted on support spindles situated substantially equal distances apart, which rotors are driven in rotation about said spindles by means of transmission members which are housed in the sections of the chassis, it being possible for said lateral sections to be transposed by means of hydraulic rams into a work position in which they are substantially aligned and into a transport position in which they are folded substantially over the central section.

2. Discussion of the Background

A machine of this kind is known from FR-2 661 312. In this machine, the chassis is composed of a central section and of three lateral sections on each side of said central section. The latter has two rotors while each lateral section just has one. Thanks to its relatively large working width, this machine meets the requirements for medium-sized agricultural concerns. However, because concerns are combining and this is leading to an increase in surface areas, demand is now tending toward haymaking machines which are even wider and have even better performance.

In other wide machines the lateral sections of the chassis fold forward or backward about approximately vertical spindles for transport. In such cases, the length of the machine is very great during transport and its center of gravity is very distant from the tractor. It is therefore more difficult to move.

SUMMARY OF THE INVENTION

The object of the present invention is to propose a haymaking machine with a very wide working width and which can readily be folded and easily moved for transport.

To this end, important features of the invention are that on each side of the central section there are four lateral sections which are articulated together by means of axes pointing substantially in the direction of travel, the length of each first lateral section is at least equal to the distance between the support spindles of two adjacent rotors, the length of each second lateral section is markedly longer than the distance between the support spindles of two adjacent rotors, the length of each third lateral section is markedly shorter than the distance between the support spindles of two adjacent rotors, and the length of each fourth lateral section is at most equal to the distance between the support spindles of two adjacent rotors.

This arrangement makes it possible to produce a haymaking machine with ten rotors which can achieve a wide working width and in which the lateral sections can be folded substantially over the central section for transport and/or setting-down. In this folded position, the first and second lateral sections point upward and the third and fourth lateral sections point downward from their respective axes of articulation. The overall size of the machine is therefore relatively small and its center of gravity remains close to the tractor.

Furthermore, each lateral section carries just one rotor, which makes it very able to adapt to unevennesses of the ground during work.

Another feature of the invention is that on each side of the central section there is a first hydraulic ram connecting said central section to the second lateral section and there is a second hydraulic ram connecting said second lateral section to the third lateral section. These hydraulic rams make it possible first of all to fold the third and fourth lateral sections through almost 180° and then to move all of the lateral sections upward through about 90° in order to reduce the overall size of the machine for transport. These hydraulic rams also make it possible to move these lateral sections in the opposite direction in order to unfold the machine for work.

According to another feature of the invention, a braking device is mounted between each third and fourth lateral section. This device slows down the movements of the fourth lateral section with respect to the third lateral section while the machine is being transposed. This device can also contain a stop that limits the movement of the corresponding fourth lateral section in the folded-for-transport position.

According to another feature of the invention, each first lateral section of the machine has a device for immobilizing the corresponding fourth lateral section in the folded position. This immobilization takes place automatically upon folding. On each side of the machine, the lateral sections are thus connected to each other, and this increases stability during transport.

BRIEF DESCRIPTION OF THE DRAWINGS

Other features and advantages of the invention will emerge from the description below of a non-limiting embodiment of the invention with reference to the appended drawings in which.

DESCRIPTION OF THE PREFERRED EMBODIMENT

Figure 1:
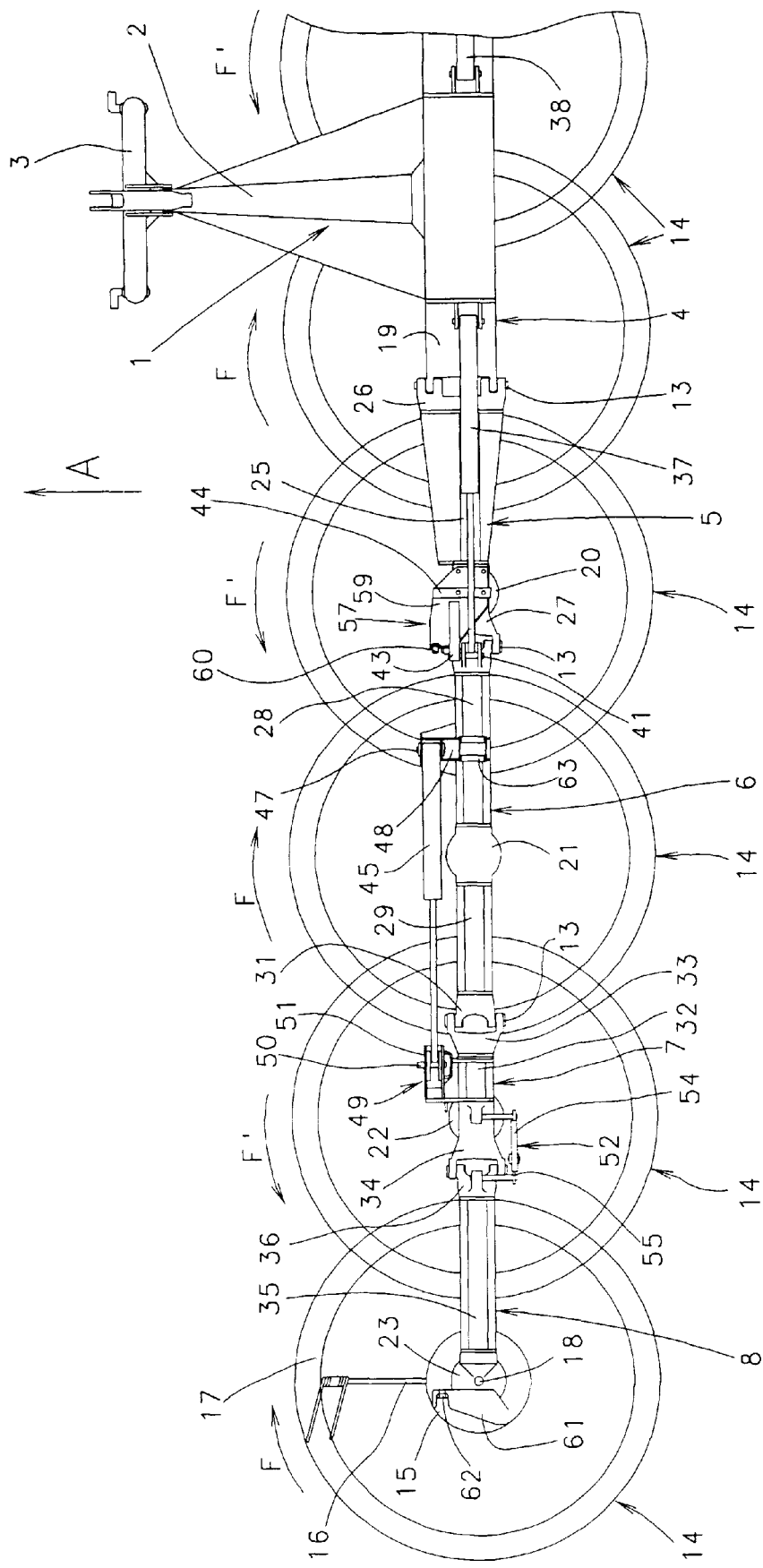
FIG. 1 depicts a top view of a part of a machine according to the invention in the work position.
Figure 2:
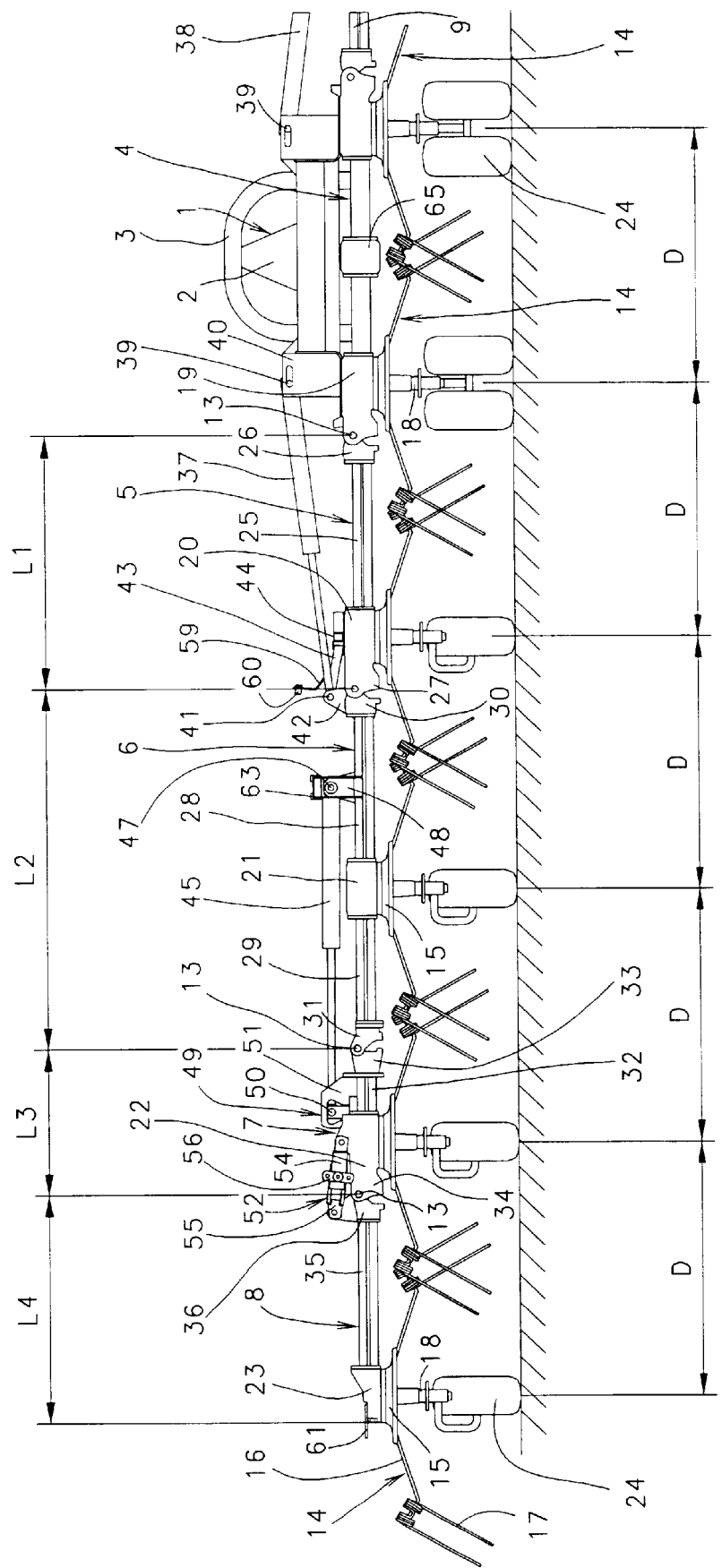
FIG. 2 depicts a rear view of the part of the machine according to FIG. 1.
Figure 3:
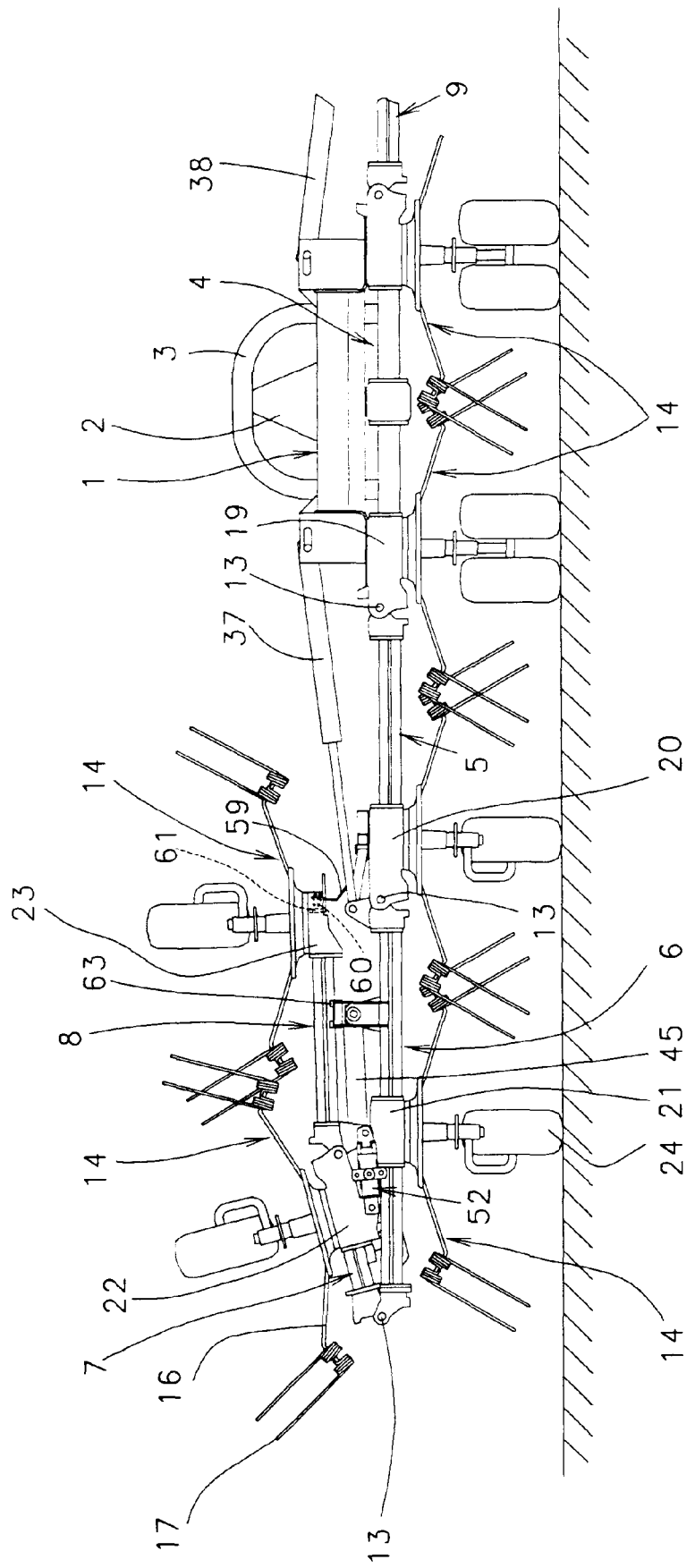
FIG. 3 depicts a rear view of the same part of the machine in a partially folded position.

For better clarity, only the left-hand part of the machine has been fully depicted in FIGS. 1 to 3. It will be understood that the right-hand part is symmetric and has the same features. This machine has a chassis 1 that can be coupled to a tractor that powers and moves it in the direction A. For this, the chassis 1 has a beam 2 which at its front end carries a coupling device 3. This chassis 1 is moreover composed of a central section 4 and of four lateral sections 5 to 8 and 9 to 12 on each side of said central section 4. In total, the chassis 1 comprises eight lateral sections. These lateral sections 5 to 12 will hereafter be known as first, second, third and fourth lateral sections, according to their position with respect to the central section 4. The beam 2 is fixed to the central section 4. The sections 4 to 12 are articulated together by means of axes of articulation 13 which are substantially horizontal and point in the direction of travel A.

The central section 4 has two rotors 14 and each lateral section 5 to 12 has just one rotor 14. Each of these rotors 14 consists of a hub 15 to which are fixed several arms 16 carrying working tines 17 at their free ends. Each of these hubs 15 is mounted so that it can rotate on a support spindle 18. The latter is substantially vertical or inclined in the direction of travel A. The support spindles 18 are mounted in bearings provided in casings 19 to 23 of their respective sections 4 to 12. They are situated substantially equal distances D apart. Each of these support spindles 18 at its lower end carries one or two wheels 24 which run along the ground during work.

The rotors 14 may be driven in rotation about their support spindles 18 by means of transmission shafts which are housed in the sections 4 to 12. For this, these transmission shafts have driving pinions which mesh with toothed crown wheels integral with the hubs 15 of the rotors 14. These driving pinions and these toothed crown wheels are housed in the casings 19 to 23 of said sections 4 to 12. At the axes 13 about which these sections 4 to 12 are articulated, said transmission shafts are connected together by cardan-joint or dog-type couplings. These couplings allow the transmission shafts to pivot with their respective sections 4 to 12 about their axes of articulation 13.

The transmission shaft that is housed in the central section 4 has an additional driving pinion in a gearbox 65. This pinion engages with a pinion integral with a transmission shaft that extends out of said gearbox 65. This transmission shaft can be connected to a power take-off of the tractor, by means of a cardan shaft.

Each first lateral section 5, 9 is composed of a tube 25, of a casing 20 which is situated above the corresponding rotor 14 and of two articulation fittings 26 and 27 situated at the ends.

The length L1 of each first lateral section 5, 9, that is to say the distance between the axes of articulation 13 situated at its two ends, is at least equal to the distance D between the support spindles 18 of two adjacent rotors 14. In the embodiment depicted, this length L1 is equal or practically equal to the distance D.

Each second lateral section 6, 10 is composed of two tubes 28 and 29, a casing 21 situated above the corresponding rotor 14 and connecting the two tubes 28 and 29 together, and two articulation fittings 30 and 31 situated at the ends. The length L2 of each second lateral section 6, 10 is markedly longer than the distance D between the support spindles 18 of two adjacent rotors 14. In the embodiment as depicted in the appended figures, this length L2 is approximately 1.5 times greater than the distance D.

Each third lateral section 7, 11 is composed of a tube 32, a casing 22 situated above the corresponding rotor 14, and two articulation fittings 33 and 34 situated at the ends. The tube 32 is relatively short, which means that the length L3 of each third lateral section 7, 11 is markedly shorter than the distance D between the support spindles 18 of two adjacent rotors 14. In the embodiment as depicted in the appended figures, this length L3 is equal to approximately 0.6 times the distance D.

Each fourth lateral section 8, 12 is composed of a tube 35, a casing 23 situated above the corresponding rotor 14, and an articulation fitting 36. Its length L4, taken from its axis of articulation 33, is at most equal to the distance D between the support spindles 18 of two adjacent rotors 14. This length is advantageously equal to approximately 0.9 times the distance D.

In a machine constructed according to the embodiment depicted, the sum of the length L1 of the first lateral section 5, 9 and the length L2 of the second lateral section 6, 10 is greater than the sum of the length L3 of the third lateral section 7, 11 and the length L4 of the fourth lateral section 8, 12 by about the distance D between two adjacent rotors 14. This arrangement allows the lateral sections 5 to 12 to be transposed into a transport position in which the first and second lateral sections 5, 9 and 6, 10 point upward from their respective axes of articulation 13 and the third and fourth lateral sections 7, 11 and 8, 12 point downward from their respective axes of articulation 13. These lateral sections 5 to 12 therefore lie practically over the central section 4.

Attached to each side of the central section 4 is a first hydraulic ram 37, 38 that connects said central section 4 to the second lateral section 6, 10. The attachment of each first hydraulic ram 37, 38 to the central section 4 is achieved by means of an axis of articulation 39 which is housed in oblong holes in two parallel plates 40 which are integral with the central section 4. The attachment of each first hydraulic ram 37, 38 to the second lateral section 6, 10 is achieved by means of an axis of articulation 41 which is engaged in cylindrical holes made in two parallel lugs 42 integral with the corresponding articulation fitting 30. Also articulated to each axis 41 is a stop 43 in the form of a rod. The free end of this stop 43 interacts with a buffer 44 provided on the housing 20 of the first lateral section 5. This buffer 44 and this stop 43 allow the angle through which the second lateral section 6, 10 pivots upward with respect to the first lateral section 5, 9 to be limited.

Provided on each side of the central section 4 is a second hydraulic ram 45, 46 that connects the second lateral section 6, 10 to the third lateral section 7, 11. It is articulated to the second lateral section 6, 10 by means of an axis 47 which is housed in cylindrical holes of two parallel lugs 48 integral with said section 6, 10. The connection between each second hydraulic ram 45, 46 and the corresponding third lateral section 7, 11 is achieved via means or mechanism 49 which give said hydraulic ram 45, 46 a long lever arm both for folding into the transport position and return to the work position. These means 49 comprise a journal 50 integral with the hydraulic ram 45, 46. This journal 50 is guided by means of an eccentric disk in such a way that it moves in slots made in plates 51 which are fixed to the third lateral section 7, 11 during transpositions of the third and fourth lateral sections 7, 11 and 8, 12. This journal 50 thus keeps the hydraulic ram 45, 46 away from the axis of articulation 13 of the third lateral section 7, 11 both in the work position and in the transport position.

The first and second hydraulic rams 37, 38 and 45, 46 are preferably double-acting rams. They are connected to the hydraulic circuit of the tractor and operated therefrom.

A braking device 52, 53 is mounted between each third lateral section 7, 11 and fourth lateral section 8, 12. This device is composed of a component 54 in the form of a sleeve which is articulated to the third lateral section 7, 11 and of a blade 55 which is articulated to the fourth lateral section 8, 12. This blade 55 is engaged in the component 54 in the form of a sleeve and can slide therein. In addition, there is a clamping piece 56 which is provided with a braking washer pressed onto the blade 55. The pressure with which it is pressed onto the blade 55 can be adjusted. The friction that results from this pressure slows down the movements of the blade 55 with respect to the component 54. It therefore also brakes the movements of the fourth lateral section 8, 12 about its axis of articulation 13. The component 54 in the form of a sleeve has a stop against which the blade 55 rests when the fourth lateral section 8, 12 is in the folded position. This stop thus determines the angle through which the fourth lateral section 8, 12 is folded in the transport position.

On each side of the central section 4 the first lateral section 5, 9 has a device 57, 58 for immobilizing the fourth lateral section 8, 12 which is on that same side of the central section 4 in the folded position for transport. Each first lateral section 5, 9 has a bent plate 59 which is fixed to the casing 20 and carries a bolt 60 pointing toward the corresponding fourth lateral section 8, 12. The latter has a lug 61 with a hole 62 in which the bolt 60 can engage in the folded position.

Each second lateral part 6, 10 on its beam 28 has a rest 63, 64 for the fourth lateral part 8, 12 in the folded-for-transport position. This rest 63, 64 advantageously has a rubber covering intended to deaden noise and soften impacts.

In the work position, the machine according to the invention occupies the position depicted in FIGS. 1 and 2. It is then coupled to a tractor and can be moved by means of this tractor in the direction of the arrow A. All the lateral sections 5 to 12 are deployed and carried by the wheels 24 which rest on the ground. The rotors 14 are driven in rotation about the support spindles 18 so that they turn in pairs converging at the front (arrows F and F').

Their tines 17 then pick up the products, for example blades of cut grass lying on the ground, move them backward and spread them out again while at the same time turning them over. The various rotors 14 can follow the unevennesses of the ground by pivoting with the sections 4 to 12 about the axes of articulation 13 of the latter. Their downward pivoting is limited by the lower ends of the articulation fittings 26, 27, 30, 31, 33, 34 and 36.

To transpose this machine into the transport position, the rotational drive of the rotors 14 is stopped. The second hydraulic rams 45, 46 are operated to make them retract. These then pull on the third lateral sections 7, 11 and make these and the fourth lateral sections 8, 12 pivot together about the axes of articulation 13 with the second lateral sections 6, 7 into the position depicted in FIG. 3. In this position, the third and fourth lateral sections 7, 11 and 8, 12 have been folded through an angle of almost 180°. The fourth lateral sections 8, 12 then rest on the rests 63, 64. During said folding, the fourth lateral sections 8, 12 pivot slightly with respect to the third lateral sections about their axes of articulation 13, especially once they have gone through the vertical position. This pivoting is braked and limited by the braking device 52, 53. The blade 55 of this device, which blade is braked by means of the clamping piece 56, is then inserted further into the component 54 in the form of a sleeve and this continues until it encounters the stop provided therein.

In addition, during said folding, the journals 50 of the hydraulic rams 45, 46 are moved in the holes made in the plates 51. In the folded position, these journals 50 lie at the opposite ends of said holes to the ends where they were situated at the beginning of the transposition. They are thus again a certain distance above the axis 13 providing articulation between the second and third lateral sections 6, 10 and 7, 11. This will allow the hydraulic rams 45 and 46 to push on the third lateral sections 7, 11 with a long lever arm when returning them to the work position.

After the aforementioned folding of the third and fourth lateral sections 7, 11 and 8, 12, the first hydraulic rams 37, 38 are operated to make them retract. They then pull on the second lateral sections 6, 10 and make them pivot about the axes 13 articulating them to the first lateral sections 5, 9. The third and fourth lateral sections 7, 11 and 8, 12 then move with the second lateral sections 6, 10. The immobilizing lugs 61 that are integral with the fourth lateral sections 8, 12 then come closer to the bolts 60 which are integral with the first lateral sections 5, 9 and become placed over these bolts 60. The latter then lie in the holes 62 of said lugs 61 and immobilize the third and fourth lateral sections 7, 11 and 8, 12 with respect to the second and the first lateral sections 6, 10 and 5, 9.

Figure 4:
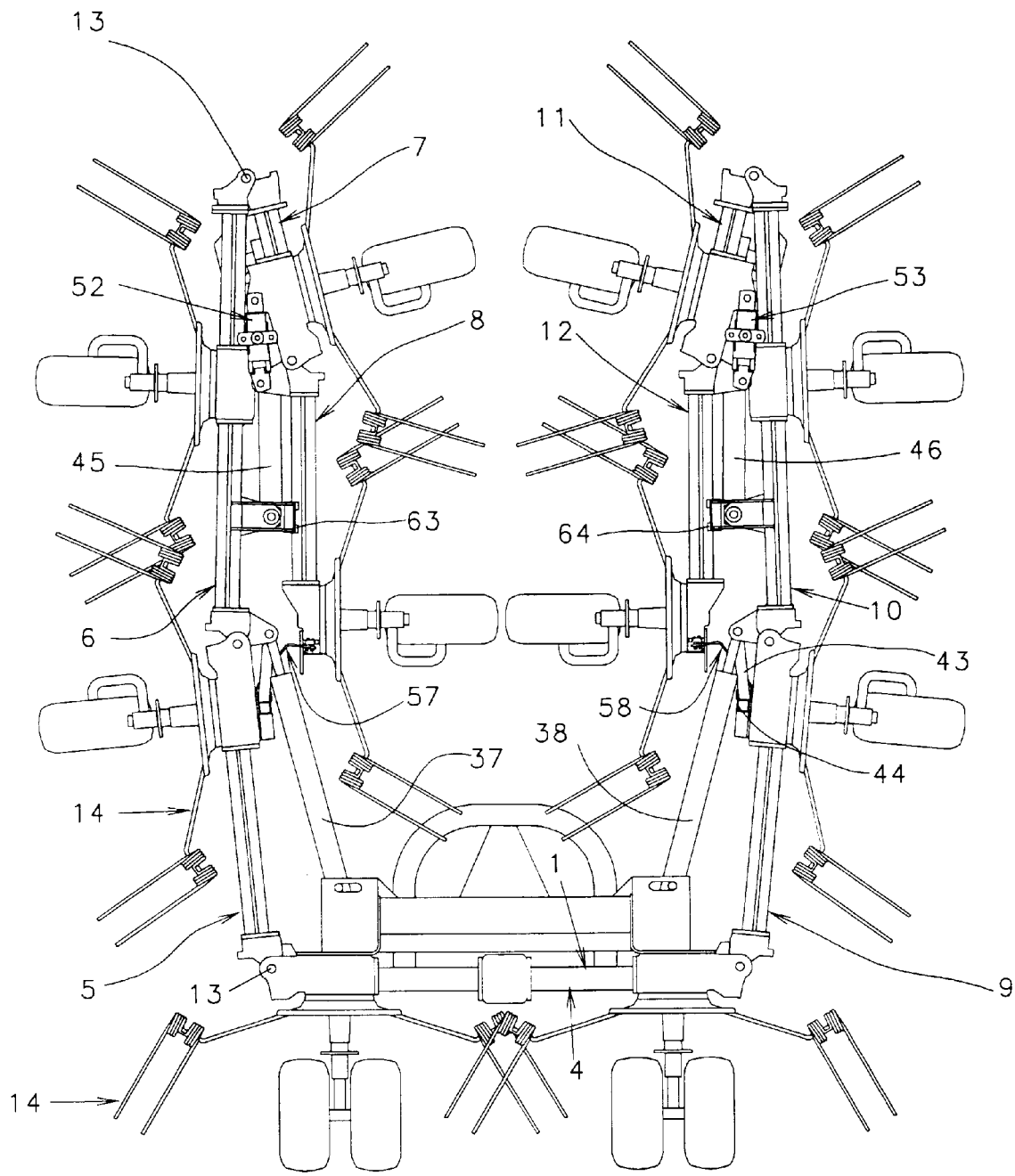
FIG. 4 depicts a rear view of the complete machine in the transport position.

The aforementioned pivoting of the second lateral sections 6, 10 continues until their stops 43 encounter the buffers 44 integral with the first lateral sections 5, 9. The angle of pivoting obtained is approximately 7°. The buffers 44 then immobilize the second lateral sections 6, 10 with respect to the first lateral sections 5, 9. The first hydraulic rams 37, 38 then make all of the lateral sections 5 to 12 together pivot about the axes 13 articulating them to the central section 4. The angle of pivoting about these axes of articulation is close to 90°. The lateral sections 5 to 12 are then substantially vertical, the first and second lateral sections 5, 9 and 6, 10 pointing upward and the third and fourth lateral sections 7, 11 and 8, 12 pointing downward from their respective axes of articulation 13 (see FIG. 4). These lateral sections 5 to 12 may optionally be locked in this position by means of mechanical bolts combined with the hydraulic rams 37, 38. The width of the machine is thus very small without its length being increased in any way. Thus this position is ideal for transport.

To return the machine to the work position, the first hydraulic rams 37, 38 are operated to make them lengthen. The lateral portions 5 to 12 then pivot downward until the wheels 24 of the rotors 15 of the first and second lateral sections 5, 9 and 6, 10 rest on the ground. When these two sections 5, 9 and 6, 10 are aligned, the lugs 61 of the fourth lateral sections 8, 12 come free of the bolts 60. Next, the second hydraulic rams 45, 46 are operated to make them lengthen. These rams push the third and fourth lateral sections 7, 11 and 8, 12 outward and make them pivot about the axes 13 articulating them to the second lateral sections 6, 10. The braking devices 52, 53 slow down the pivoting of the fourth lateral sections 8, 12 about the axes 13 articulating them to the third lateral sections 7, 11 when they have gone through the vertical position. During this pivoting of the third and fourth lateral sections 7, 11 and 8, 12 the journals 50 of the second hydraulic rams 45, 46 move upward in the slots in the plates 51 so that they again lie a certain distance above the axes of articulation 13. When all the sections 4 to 12 are aligned again, the rotors 14 can be driven in rotation as described earlier.

It is quite clear that the invention is not restricted to the embodiment described and depicted in the appended drawings. Modifications are still possible especially as regards the construction of the various elements or by substituting technical equivalents, without in any way departing from the field of protection.

What is claimed as new and desired to be secured by Letters Patent of the United States is:

1. A haymaking machine, comprising a chassis that is couplable to a tractor, said chassis being composed of a central section and several lateral sections which are articulated together and which carry rotors mounted on support spindles situated substantially equal distances apart, said rotors being driven in rotation about said spindles by transmission members which are housed in the sections of the chassis, said lateral sections being transposable by hydraulic rams into a work position wherein said lateral sections are substantially aligned and into a transport position in which said lateral sections are folded substantially over the central section, wherein on each side of the central section four lateral sections are positioned which are articulated together by axes extending substantially in the direction of travel, the length of each first lateral section being at least equal to the distance between the support spindles of two adjacent rotors, the length of each second lateral section being substantially longer than the distance between the support spindles of two adjacent rotors, the length of each third lateral section being substantially shorter than the distance between the support spindles of two adjacent rotors, and the length of each fourth lateral section being at most equal to the distance between the support spindles of two adjacent rotors.

2. A machine as claimed in claim 1, wherein the sum of the length of the first lateral section and the length of the second lateral section is greater than the sum of the length of the third lateral section and the length of the fourth lateral section by about the distance between the support spindles of two adjacent rotors.

3. A machine as claimed in claim 1, wherein the length of each first lateral section is substantially equal to the distance between the support spindles of two adjacent rotors.

4. A machine as claimed in claim 1, wherein the length of each second lateral section is approximately 1.5 times greater than the distance between the support spindles of two adjacent rotors.

5. A machine as claimed in claim 1, wherein the length of each third lateral section is equal to approximately 0.6 times the distance between the support spindles of two adjacent rotors.

6. A machine as claimed in claim 1, wherein the length of each fourth lateral section is equal to approximately 0.9 times the distance between the support spindles of two adjacent rotors.

7. A machine as claimed in claim 1, wherein on each side of the central section there is a first hydraulic ram connects said central section to the second lateral section and a second hydraulic ram connects said second lateral section to the third lateral section.

8. A machine as claimed in claim 1, what comprises is a buffer on each first lateral section and a stop on each second lateral section in order to limit the upward pivoting of each second lateral section.

9. A machine as claimed in claim 1, wherein a braking device is mounted between each third and fourth lateral section to brake the movements of each fourth lateral section.

10. A machine as claimed in claim 9, wherein the braking device is composed of a component in the form of a sleeve which is articulated to the third lateral section, a blade which is articulated to the fourth lateral section and which slides in said component, and a clamping piece provided with a washer for braking the blade.

11. A machine as claimed in claim 10, wherein the component in the form of a sleeve has a stop against which the blade rests when the fourth lateral section is in the folded position.

12. A machine as claimed in claim 1, wherein each first lateral section has a device for immobilizing each fourth lateral section in the folded position.

13. A machine as claimed in claim 12, wherein each first lateral section has a plate with a bolt and each fourth lateral section has a lug with a hole in which said bolt is engageable.

14. A machine as claimed in claim 1, wherein the second lateral sections have rests for the fourth lateral sections in the folded position.

* * * * *